United States Patent [19]

Oosterkamp

[11] Patent Number: 5,085,826
[45] Date of Patent: Feb. 4, 1992

[54] STEAM DRYER

[75] Inventor: Willem J. Oosterkamp, Los Gatos, Calif.

[73] Assignee: General Electric Company, San Jose, Calif.

[21] Appl. No.: 633,750

[22] Filed: Dec. 20, 1990

[51] Int. Cl.⁵ .............................................. G21C 15/16
[52] U.S. Cl. ..................................... 376/371; 376/377; 55/399
[58] Field of Search ............... 376/370, 371, 352, 377, 376/378; 55/398, 399

[56] References Cited

U.S. PATENT DOCUMENTS

| | | | |
|---|---|---|---|
| 1,573,135 | 2/1926 | Bourne et al. | 55/398 |
| 2,222,930 | 11/1940 | Arnold | 55/399 |
| 2,542,635 | 2/1951 | Davis et al. | 55/399 |
| 3,063,925 | 11/1962 | Huet et al. | 376/371 |
| 3,339,631 | 9/1967 | McGurty et al. | 376/377 |

*Primary Examiner*—Brooks H. Hunt
*Assistant Examiner*—Frederick H. Voss

[57] ABSTRACT

The present invention is directed to a separator for dividing a steam/water mixture into its liquid and steam components. The inventive separator comprises a pipe having an annular spiral strip which is attached to its inside wall, said pipe being in fluid communication with ports for removal of liquid water divided from said mixture. The width of the annular spiral strip preferably is about 1/10th to 1/20th of the diameter of the pipe to which it is attached. A method for dividing steam/water mixtures into their liquid and steam components by passing such mixture through the inventive separator forms yet another aspect of the present invention.

5 Claims, 1 Drawing Sheet

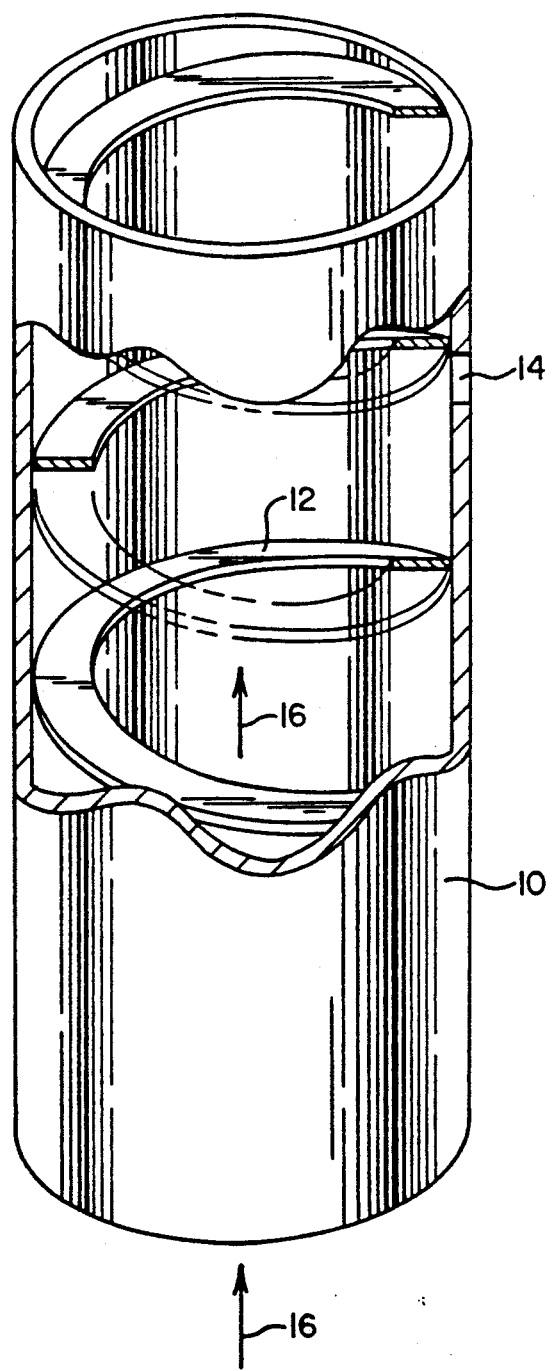

STEAM DRYER

BACKGROUND OF THE INVENTION

The present invention is directed to a vapor/liquid separator and more particularly to a separator especially adapted to separate steam and liquid water generated by a nuclear boiling water reactor (BWR).

Existing large BWRs are the forced-circulation type. In BWRs undergoing power generation operations, reactor coolant, initially in the form of sub-cooled liquid (e.g. water), is circulated by main coolant recirculation devices (e.g. jet pumps or mixed-flow motor-driven pumps) around a path a portion of which is comprised of the core lower plenum region (located at the bottommost section of the reactor), thence through the nuclear core and into a core upper plenum in communication with the core. Flow exiting the core upper plenum then passes through standpipes that lead to an assembly of steam separators. The reactor coolant exiting the nuclear core and passing into the core upper plenum is a two-phase mixture of steam and water, the proportion of which varies depending upon such factors a the power output from the fuel bundles, the amount of sub-cooling present in the coolant entering the fuel bundle, and the amount of flow through the bundles. This last factor depends on the power of the recirculation pumps and the hydrodynamic flow resistance presented by the fuel bundle geometry and wetted surfaces, and the amount of orificing representing restrictions to flow just prior to the coolant's entrance into the core fuel assembly.

Joining with the core effluent in the core upper plenum is the core "by-pass" flow, which is reactor coolant that has flowed from the core lower (entrance) plenum into the region external to the fuel assembly channels (but inside the core shroud), thence upwardly generally through the region occupied by cruciform-shaped control blades which stand in various degrees of insertion into the core, thence across the upper grid member (called the "top guide") which with its lattice-like configuration keeps the fuel assemblies in a regular array, and finally into the core upper plenum. This by-pass coolant stream at its discharge into the core upper plenum is compromised substantially of saturated liquid, with perhaps a small amount of steam. Within the core upper plenum, these two effluents—by-pass flow and fuel bundle exit flow—rapidly mix together and quickly lose identity from their origins.

Mechanical steam separation can be utilized to accomplish the separation of the steam from the steam/water mixture exiting the core. Some earlier BWR designs used free-surface steam separation where, just as in the household tea kettle, steam separates unaided from the free-surface, and saturated water remains in the bulk coolant, which in BWRs is recirculated back down the downcomer annulus. This type of steam separation is feasible so long as the steam-leaving velocity, i.e. the bulk average velocity of the steam taken across the available pathway flow area, is not large, i.e., is not greater than about 1.8 foot/second. If steam-leaving velocities exceed this value, there tends to be carried along with the steam an unacceptably high moisture content. The high moisture levels saturate the moisture-drying abilities of the steam dryer, thus resulting in an unacceptably high moisture content in the steam dryer, thus resulting in an unacceptably high moisture content in the steam leaving the reactor and supplied to the turbine. When steam moisture contents are too high in the turbine steam flow, accelerated erosion can occur on first-stage turbine blades and the efficiency of the turbine is reduced.

It is possible to obtain free-surface separation capabilities if the reactor pressure vessel (RPV) cross-sectional area is made sufficiently large. However, cost economics dictate that minimum diameter RPVs be used, so that mechanical steam separation has been developed to handle the high power output steam production levels of modern BWRs. In these latter designs, the steam bulk average velocity moving through the wet steam plenum region immediately downstream of the mechanical steam separators is about 5 feet/second.

The fuel assemblies grouped over the central region of the core tend to have higher exit steam qualities than do bundles located at the peripheral region of the core. It is desirable, nonetheless, that the flow rates and steam/water mixture proportions entering the steam separator standpipes be relatively uniform. To facilitate gaining more nearly uniform steam/water mixture for entry into the standpipes, the standpipe entrances are separated from the fuel assemblies by a distance of, for example, about 5 feet. Turbulent mixing occurring between the plumes leaving adjacent fuel assemblies, each with a different void content, is one mechanism acting to produce a more nearly uniform mixture which enters into the steam separator standpipes. More important to achieving flow mixture uniformity, however, is the hydrodynamic flow resistance represented by the standpipes, each with their end-mounted steam separators. Complete flow mixture uniformity entering the standpipes is at best difficult to achieve and, even with a five-foot separation between fuel assembly exits and standpipe entrances, it is not a design basis used for reactor performance evaluations.

The steam separator assembly consists of a domed of flat-head base on top of which is welded an array of standpipes with a three-stage steam separator, for example, located at the top of each standpipe. One function of the standpipes is to provide a stand-off separation of the larger-diameter steam separators, which are generally arranged in a particularly tightly-compacted arrangement in which external diameters of adjacent separators are nearly touching with each other, so that separated liquid coolant discharged at the bottom of the separator has a more "open" flow path outwardly from the reactor longitudinal axis and out to the downcomer annulus region which lies at the inboard periphery to the RPV. A second purpose for the standpipes is a high-power-output natural-circulation reactor using mechanical steam separators is to provide juxtaposed regions which promote natural-circulation by means of a vertical region of two-phase (and, thus, low-density) coolant inside the standpipes which is juxtaposed against single-phase liquid coolant outside the standpipes in a so-called "downcomer region", in which region height provides a very significant part of the total natural circulation driving head for coolant flow circulation within the reactor.

The steam separator assembly rests on the top flange of the core shroud and forms the cover of the core discharge plenum ("core upper plenum") region. The seal between the separator assembly and core shroud flange is a metal-to-metal contact and does not require a gasket or other replacement sealing devices. The fixed axial flow type steam separators have no moving parts and are made of stainless steel, for example, to resist corrosion and erosion.

In each separator, the steam/water mixture rising through the standpipes (the "standpipe region") impinges upon vanes which give the mixture a spin, thus enabling a vortex wherein the centrifugal forces separate the water from the steam in each of three stages. Steam leaves the separator at the top of this assembly and passes into the wet steam plenum below the dryer. The separated water exits from the lower end of each stage of the separator and enters the pool (the "downcomer region") that surrounds the standpipes to join the downcomer flow. The steam exiting from all separators either may be in the same horizontal plane, or the separators may be arranged in a slightly crowned fashion at the center to compensate for the crowned water gradient of the pool surrounding the standpipes.

The steam separator assembly may be bolted to the core shroud flange by long hold-down bolts, or the separator together with the dryer assembly may be held down onto the core shroud flange by contact from the reactor head when the latter is assembled to the reactor vessel. The nominal volumetric envelope of the steam separator assembly is defined by the horizontal plane of its lower flange that contacts the core shroud flange, its cylindrical sides that provide part of the five-foot stand-off from the fuel assembly exits, the circumscribed diameter of the outermost row of standpipes, the circumscribed diameter of the outermost row of standpipes, the circumscribed diameter of the outermost row of steam separators, and the generally horizontal plane of the exits to the steam separators.

The core upper plenum region in a BWR currently under design known as the "simplified boiling water reactor" (SBWR) is substantially devoid of other mechanical devices, pipes, or structures; whereas the core upper plenum of a BWR/6 and "advanced boiling water reactor" (ABWR) reactor design generally contains spargers and nozzles for core sprays, and distribution headers for core flooders, respectively. In both reactor types, these spargers/headers are located at the outer periphery of the core upper plenum, mounted below the core shroud flange so that the sparger/header is clear of the refueling removal path of peripheral fuel assemblies and, thus, do not become removed during core refueling operations.

With specific reference to a natural-circulation SBWR, it will be observed that there are no recirculation pumps to aid in coolant recirculation. Steam generation in the core produces a mixture of steam and water which, because of steam voids, is less dense than saturated or sub-cooled water. Thus, the boiling action in the core results in buoyancy forces which induce core coolant to rise upwardly, to be continuously replaced by non-voided coolant arriving from beneath the core in the core lower plenum region. As the coolant leaves the core, it rises through the core upper plenum region, then through the standpipes region, and finally into the steam separators. This voided mixture inside these standpipes continues to be less dense than non-voided coolant external to the standpipes, resulting in the development of additional buoyancy force to further drive the coolant circulation. That this process is quite effective in promoting coolant recirculation can be noted from reported tests made in forced-circulation power reactors where the coolant circulation pumps are shut off. Even with their relatively short steam separator standpipes, reactor power levels of 25% and coolant flow rates of 35% of rated flow, are readily and safely maintainable.

The SBWR reactor is but modestly different from the forced-circulation BWR, with the most prominent differences being that the standpipes region is to be considerably longer in the SBWR (to develop a higher differential head), the core overall height may be somewhat shorter (for example, being 8 or 9 feet active fuel length versus 12.5 feet active fuel length in recent forced-circulation reactors), and the core power density will be somewhat lower. The severity of orificing—a means to promote hydrodynamic stability—at the entrance to the BWR fuel bundles may be lessened. The fuel bundle may have a larger diameter fuel rod in, for example, a $6 \times 6$ rod array, whereas the rod array for a forced-circulation reactor often is an $8 \times 8$ rod array. The design flow rates per fuel bundle, and the flow rates per steam separator, will be somewhat reduced in the SBWR design. Fuel exit steam quality will be approximately the same between the two designs. In the SBWR reactor design, no spargers or discharge headers are installed in the core upper plenum, while in the ABWR reactor, spargers or discharge headers are installed in the upper core plenum.

In some versions of SBWR reactors under study, the standpipes are very long while the core upper plenum is short. In other versions, the converse is true. The present invention is applicable equally in either version.

In conventional BWRs, the steam separation process takes place in two components; a steam separator of the swirler type, which removes the bulk of the water; and a steam dryer of the vane type, which brings the steam wetness down to the specified level. This invention is intended to replace the steam dryer. The invention can also be used as steam dryer in the exhausts of conventional turbine stages.

Wet steam reduces the thermal efficiency of the turbine and a large water content of the steam even can lead to serious damage to the turbine. As described above, present designs of steam dryers comprise bulky apparatus which have to be fitted into the RPV. Space has to be provided to be able to store the steam dryers on the refueling floor during outages, which further complicates the layout of the containment and reactor building design. Accordingly, there is room for improvement vapor/liquid separators, especially those adapted to divide steam/water mixtures from nuclear boiling water reactors.

BROAD STATEMENT OF THE INVENTION

The present invention is directed to a separator for dividing a steam/water mixture into its liquid and steam components. The inventive separator comprises a pipe having an annular spiral strip which is attached to its inside wall, said pipe being in fluid communication with ports for removal of liquid water divided from said mixture. The width of the annular spiral strip preferably is about 1/10th to 1/20th of the diameter of the pipe to which it is attached. A method for dividing steam/water mixtures into their liquid and steam components by passing such mixture through the inventive separator forms yet another aspect of the present invention.

Advantages of the present invention include a separator design that operates at high steam/water mixture velocities. Another advantage is the ability to impart a swirling motion to the mixture for urging liquid to deposit on the inside pipe wall and consequent agglomeration of fine liquid so deposited. These and other advantages will be readily apparent to those skilled in the art based upon the disclosure contained herein.

BRIEF DESCRIPTION OF THE DRAWING

The drawing is a simplified cross-sectional elevational view of the inventive separator. The drawing will be described in detail below.

DETAILED DESCRIPTION OF THE INVENTION

In the drawing, pipe 10 will be seen to have annular spiral strip 12 affixed thereto, preferably by welding. Port 14 can be suitable connected to a dewatering line for removal of liquid component divided from mixture 16 which is passed through pipe 10. The combination forms the inventive separator.

Annular spiral strip 12 imparts a rotation to the steam with centrifugal force bringing water droplets (liquid) to the inside wall of pipe 10. The droplets then will be collected by spiral strip 12. Small droplets impact the wall and remain on the wall. The droplets follow the wall and are urged against spiral strip 12. As they follow strip 12, the droplets will grow by agglomeration with other collected droplets. The agglomerated liquid can be removed through port 14 or other more or less sophisticated devices that insure that nearly all the water, but not much steam, is bled from the interior of pipe 10.

Annular twisted strip 12 will be seen to impart a rotational motion to mixture 16 passed through pipe 10. The rotation motion to the fluid means that much denser liquid drops will be forced outward and will be collected on the inside wall of pipe 10 and via strip 12.

By leaving the central portion of pipe 10 empty, the bulk of the steam or vaporous components can flow at high velocity unimpeded through pipe 10. High velocity, for present purposes, comprehends a flow rate of between about 10 m/sec and 100 m/sec.

It will be seen, then, that the inventive separator integrates a swirler and water agglomerator into a steam line of a BWR. Its design permits the steam flow to be swirled, and water agglomerated, while permitting steam to flow at high velocity therethrough.

I claim:

1. A separator for dividing a steam/water mixture into its liquid and steam components, comprising a pipe having an empty central portion and an annular spiral strip which is attached to its inside wall, said pipe having ports for removal of liquid water divided from said mixture.

2. The separator of claim 1 wherein the width of said strip ranges between about 1/10 and 1/20 of the diameter of said pipe.

3. A method for dividing a steam/water mixture into its liquid and steam components which comprises passing said mixture through a separator comprising a pipe having an empty central portion an annular spiral strip which is attached to its inside wall, said pipe having ports for removal of liquid water divided from said mixture.

4. The method of claim 3 wherein the width of said strip ranges between about 1/10 and 1/20 of the diameter of said pipe.

5. The method of claim 3 wherein said mixture is generated in a nuclear boiling water reactor.

* * * * *